(12) United States Patent
Merino Sanchez et al.

(10) Patent No.: US 8,641,998 B2
(45) Date of Patent: Feb. 4, 2014

(54) PROCEDURE FOR OBTAINING GRAPHENE OXIDE NANO-PLATELETS AND DERIVATES AND GRAPHENE OXIDE NON-PLATELETS THUS OBTAINED

(75) Inventors: Cesar Merino Sanchez, Burgos (ES);
Ignacio Martin Gullon, Alicante (ES);
Helena Varela Rizo, Alicante (ES);
Maria Del Pilar Merino Amayuelas, Burgos (ES)

(73) Assignee: Grupo Antonlin-Ingerieria, S.A., Burgos (ES)

( * ) Notice: Subject to any disclaimer, the term of this patent is extended or adjusted under 35 U.S.C. 154(b) by 139 days.

(21) Appl. No.: 13/150,928

(22) Filed: Jun. 1, 2011

(65) Prior Publication Data

US 2012/0208022 A1    Aug. 16, 2012

(30) Foreign Application Priority Data

Feb. 16, 2011   (EP) .................................... 11382044

(51) Int. Cl.
*C01B 31/02* (2006.01)
*C01B 31/04* (2006.01)
*C03C 25/68* (2006.01)

(52) U.S. Cl.
USPC ......... 423/415.1; 216/55; 216/96; 423/445 R; 423/448

(58) Field of Classification Search
USPC ........................................................ 428/402
See application file for complete search history.

(56) References Cited

U.S. PATENT DOCUMENTS

| | | | |
|---|---|---|---|
| 405,480 A * | 6/1889 | Hughes et al. | 423/447.3 |
| 6,975,025 B2 * | 12/2005 | LeBonheur et al. | 257/700 |
| 8,124,227 B2 * | 2/2012 | Gonzalez Moral et al. | 428/364 |
| 2004/0166048 A1 * | 8/2004 | Morita et al. | 423/447.3 |
| 2009/0220409 A1 * | 9/2009 | Curliss et al. | 423/447.2 |

FOREIGN PATENT DOCUMENTS

WO   2010/022164 A1   2/2010

OTHER PUBLICATIONS

Martin-Gullon et al., Differences between carbon nanofibers produced using Fe and Ni catalysts in a floating catalyst reactor, Carbon 44 (2006) 1572-1580.*
Endo et al., Microstructural changes induced in 'stacked cup' carbon nanofibers by heat treament, Carbon 41 (2003) 1941-1947.*
Calvillo et al., Study of the surface chemistry of modified carbon nanofibers by oxidation treatments in liquid phase, J. of Nanoscience and Nanotechnology, vol. 9 (7), 4164-4169 (2009).*
Li et al., Processable aqueous dispersions of graphene nanosheets, Nature Nanotechnology, vol. 3, 2008, 101-105 (DOI: 10.1038/NNANO.2007.451).*
Lotya et al., Liquid phase production of graphene by exfoliation of graphite in surfactant/water solutions, J.Am.Chem.Soc. (2009) 131, 3611-3620.*
Iyengar et al., Conductance through grahene bends and polygons, Physical Review B 78, 23511 (2008).*

* cited by examiner

*Primary Examiner* — Hoa (Holly) Le
(74) *Attorney, Agent, or Firm* — Banner & Witcoff, Ltd

(57) ABSTRACT

A method for manufacturing graphene oxide nanoplatelets and derivative products and the graphene oxide nanoplatelets obtained, comprising two distinct phases, a first phase for obtaining an intermediate material consisting of carbon nanofilaments, each one having a structure comprising continuous ribbon of graphitic material with a small number of stacked monoatomic graphene layers and spirally rolled around and along the main axis of said nanofilaments, and a second phase wherein said carbon nanofilaments are subjected to a high-temperature treatment in order to clean said filaments and increase their degree of crystallinity. Once these nanofilaments are treated, a chemical etching is performed on them comprising an oxidation that causes the fragmentation of the carbon nanofilaments and starts a cleaving method that is completed by physical means in order to obtain graphene oxide nanoplatelets.

22 Claims, 3 Drawing Sheets

PROCEDURE FOR OBTAINING GRAPHENE OXIDE NANO-PLATELETS AND DERIVATES AND GRAPHENE OXIDE NON-PLATELETS THUS OBTAINED

The present application claims priority to European Application No. 11382044.3, filed Feb. 16, 2011, the contents therein is incorporated by reference.

TECHNICAL FIELD OF THE INVENTION

This invention relates to a method for obtaining graphene oxide nanoplatelets and derived products, and the graphene oxide nanoplatelets thus obtained.

The invention is characterised by a method for obtaining graphene oxide nanoplatelets comprising a first phase that allows obtaining an intermediate material that is used for the subsequent production of graphene oxide nanoplatelets, wherein this intermediate material obtained consists of carbon nanofilaments each one having a structure which comprises a continuous ribbon of graphitic material with a small number of stacked monoatomic graphene layers and which is spirally rolled around and along the main axis of said nanofilament.

The invention is also characterised by a method for obtaining graphene oxide nanoplatelets comprising a second phase in which the nanofilaments are subjected to a high temperature method for their purification, dehydrogenation, defunctionalization and crystallisation.

BACKGROUND OF THE INVENTION

Graphene is a material with a monatomic layer structure formed by carbon atoms that are ordered in a honeycomb crystal lattice linked by carbon-carbon covalent bonds.

Graphene is therefore a 2-dimensional crystal material with distinctive electronic properties that are different from graphite in which the stacking of many of these monoatomic graphene layers occurs.

In the case of stacks of up to 10 monoatomic graphene layers, the electronic properties of the material are interesting and distinctive enough from an industrial point of view. In particular, a clearly semimetallic behaviour is observed in stacks of less than six monoatomic graphene layers, in contrast to stacks of more layers, for which this behaviour is notably reduced, such that the electronic properties of stacks of eleven or more monoatomic graphene layers change significantly, quickly becoming closer to graphite electronic properties as the number of layers increases.

In practice, graphene for industrial applications will be used as stacks of up to 10 monoatomic graphene layers. Thus, generally speaking the use of the term graphene is allowed when the number of stacked layers is less than 11, and more specifically for stacks of less than six monoatomic graphene layers.

Graphene in its free state was first obtained in 2004 by the micromechanic cleaving of graphite using "Scotch tape".

The method consists in separating individual graphene layers from a graphite crystal in which the graphite is formed by a great number of stacked graphene layers by using an adhesive tape.

Other methods are also known to synthesise graphene, such as chemical vapour deposition (CVD), for example. In this method graphene grows by chemical vapour deposition of hydrocarbons deposited onto a metal substrate.

These techniques described for graphene synthesis are carried out on a small scale to produce small amounts, for use in laboratories, for example.

Currently, in order to produce large amounts of graphene, for industrial proposals, for example, chemical methods are used with subsequent cleaving, using thermal methods or ultrasound.

These chemical methods for obtaining graphene, use graphite as a starting material, and usually start by oxidizing it in order to obtain graphite oxide.

The most common method for obtaining graphite oxide consists of using natural graphite as a starting material, involving a step in which oxysalts are intercalated in between strong acids which decompose in the presence of air, thus producing an intermediate solid compound called graphite oxide (GO).

Amongst these methods, we can highlight that of Brodie of 1860 ($KClO_3$ in $HNO_3$), Staudenmeier of 1898 ($KClO_3$ in $H_2SO_4$) and Hummers and Offemann of 1956 ($KMnO_4$ in $H_2SO_4$).

In graphite oxide, the graphite sheets become corrugated due to the high oxidation (epoxide groups, hydroxyl groups, carboxylic groups), resulting in an increase of the distance between their sheets, to at least double such distance, thus facilitating the subsequent cleaving.

In order to produce graphene from graphite oxide, in which the graphite oxide is formed by the overlapping of hundreds of layers of graphene oxide, variants to the cleaving method of the graphite oxide have been proposed so as to produce monatomic layers or otherwise a stacking of a reduced number of monoatomic layers. One of the most interesting cleaving methods is ultrasound cleaving in a liquid medium, which produces graphene oxide particles in suspension.

This latter method produces individual sheets that are free in suspension due to the electrostatic interactions between the oxygenated functions and the liquid medium.

The advantage of synthesising graphene from carbon nanotubes has been demonstrated in the past two years. These carbon nanotubes have fewer stacked layers of graphene than graphite, thus providing a material of greater quality.

Along these lines, Kosynkin et al., using carbon nanotubes as starting material to obtain graphene nanoribbons, disclosed a modified oxidation method based on the traditional method by Hummers and Offemann.

This method is based on the method by Hummers and Offemann and it consists in a chemical oxidation to produce graphene nanoribbons by longitudinally opening and unravelling of the layers of carbon nanotubes, wherein said carbon nanotubes could be multi-walled, two-walled or single-walled.

Patent WO201022164 illustrates this manufacturing method for graphene nanoribbons.

Graphene nanoribbons consists of a graphene ribbon with a high aspect ratio, higher than 50. These ribbons could usually reach lengths ranging from 10 nm to $10^5$ nm. and widths from 5 nm to $10^4$ nm.

On the other hand, these nanoribbons possess highly irregular edges at an atomic scale, such that they do not have a polygonal configuration.

The object of the current invention consists in a method for obtaining high quality graphene oxide nanoplatelets in a sufficient amount to allow their use at an industrial scale.

DESCRIPTION OF THE INVENTION

In view of the above, this invention relates to a method for obtaining graphene oxide nanoplatelets and derived products, said method comprising the following steps:

a) Dosing of at least the following compounds:
   i. A hydrocarbon or mixture of hydrocarbons,
   ii. A compound of nickel and a compound of sulphur to generate catalytic particles,
   iii. A carrier gas,
b) Placing the dosed compounds listed in step a) inside a furnace with a working temperature of between 900° C. and 1500° C., where a chemical vapour deposition method occurs by the floating catalyst method,
c) Obtaining an intermediate material comprising carbon nanofilaments, the structure of which comprises a continuous graphitic ribbon, where said ribbon comprises a stack of less than eleven graphene layers spirally rolled around, and along the nanofilament main axis,
d) Heat treatment of the carbon nanofilaments obtained in step c) by exposing them to temperatures comprised between 1500° C. and 3000° C. in an inert atmosphere in order to purify, dehydrogenate, defunctionalise and crystallise said nanofilaments to a modified structure, in which the number of carbon-carbon bonds is greater than the number of carbon-carbon bonds present in the carbon nanofilaments obtained in step c),
e) Chemical etching comprising a phase of liquid phase oxidation of the treated carbon nanofilaments from step d), causing their fragmentation, so that starting the cleaving of said graphene layers,
f) Completing the carbon nanofilament cleaving method by a physical method in order to obtain graphene oxide nanoplatelets with the following features:
   polygonal geometry,
   less than six stacked graphene layers,
   a maximum length comprised within the interval ranging from 0.1 µm and 50 µm.

The maximum length of the nanoplatelet will be understood as the maximum length reached by the longer side of the graphene oxide nanoplatelets.

Hereinafter, the term polygonal will be used to define a shape delimited by clearly defined and straight edges.

The quality of the graphene oxide nanoplatelets is directly related to the number of stacked layers of graphitic material they are made of, the regularity of their structure, and the size of the graphene oxide nanoplatelets obtained.

The number of layers is inversely proportional to their quality, such that the fewer the layers the higher the quality of the product obtained, since its properties are close to those observed for pure graphene, that is monoatomic graphene layers.

The regularity of the structure is directly proportional to quality, such that the more regular the structure of the graphene oxide nanoplatelets obtained, the greater their degree of crystallinity and the better their behaviour for subsequent applications.

Finally, the size of the graphene oxide nanoplatelets is also directly proportional to their quality, such that larger nanoplatelets are considered of greater quality, since they facilitate their subsequent handling and application, thus favouring the quality of the products obtained from them.

All these features added to the ability to produce the material at industrial scale render a high quality graphene suitable for mass use in a large number of possible applications.

Having defined the term high quality for graphene, each of these features will be disclosed in order to state their dependency on the method of the invention and on its different steps.

This method is divided into two distinct phases, a first phase of the method in which an intermediate material is obtained to be used as starting material in a subsequently second phase, and such second phase in which the graphene oxide nanoplatelets themselves are obtained.

The first phase of the method consists of a set of steps resulting in an intermediate material consisting of carbon nanofilaments that have a structure formed by a reduced number of graphene layers, specifically carbon nanofilaments comprising a number of less than eleven stacked monoatomic graphene layers.

Therefore, in order to produce the graphene oxide nanoplatelets, the second phase starts with a material exhibiting a small number of stacked graphene layers in its structure, and therefore the number of layers of the graphene oxide nanoplatelets obtained in said second phase of the method will also necessarily be small.

As explained above, few graphene layers implies a high quality material, also involving high quality physical properties, therefore, the method of the invention renders oxide graphene manoplatelets with a small number of stacked graphene layers and consequently a high quality material.

Hence, carbon nanofilaments with this particular structure are much more interesting as starting material for obtaining graphene oxide than other materials such as graphite formed by hundreds of graphene layers or multiwalled carbon nanotubes, which exhibit low accessibility between their layers thus making them much less reactive than carbon nanofilaments, each of these nanofilaments having a structure with a continuous ribbon of graphite material stacked in a small number of monoatomic graphene layers, and spirally rolled around and along the main axis of said nanofilament.

The second phase of the method starts with a heat treatment applied to the carbon nanofilaments obtained in the first phase of the method, in order to purify, dehydrogenate, defunctionalise and crystallise them, thus producing a modified material with a highly crystalline structure.

Therefore, on the one hand, we have the purification of the carbon nanofilaments, by eliminating polycyclic aromatic hydrocarbons amongst other impurities, and other unwanted compounds present in the carbon nanofilaments obtained in step c), and on the other hand, the increase of the degree of crystallinity of its structure as a result of the defunctionalization and dehydrogenation processes.

Due to the effect of these methods by exposing the nanofilaments to high temperature heat treatment, a modified structure with a greater number of carbon-carbon bonds is obtained.

This highly crystalline structure of the carbon nanofilaments, once subjected to the heat treatment of step d), increases their stability, and enables the obtention of carbon nanoplatelets by etching said carbon nanofilaments in a more orderly and controlled way, thus producing graphene oxide nanoplatelets with a clearly defined regular and polygonal shape.

As defined above, another feature which defines the quality of graphene is the regularity of its structure. Therefore, and since graphene oxide nanoplatelets produced by the method of the invention have a regular structure with a polygonal geometry in which the sides form clearly defined straight edges, we have a high quality product.

On the other hand, said heat treatment causes the formation of loops or bonds between the free edges nearby graphene layers within the carbon nanofilaments.

Hereinafter, nearby layers will be understood as those that are either contiguous or those between which there are less than nine monoatomic graphene layers.

This phenomenon occurs as a result of the dehydrogenation and defunctionalization of said free edges.

Therefore, once the functional groups and the hydrogen atoms are removed from said free edges, the carbon atoms present in these edges tend to bond to other carbon atoms located in a nearby graphene layer, thus achieving a more stable state.

Part of the bonds between two nearby graphene layers formed by these loops that are formed during the heat treatment step of the carbon nanofilaments, are not destroyed during the subsequent steps of the chemical etching of the carbon nanofilaments and the completion of the cleaving step.

Thus part of the graphene layers remain bonded through these loops that have not been destroyed, resulting in greater sized graphene oxide nanoplatelets, that are different from nanoplatelets obtained in methods in which the nanofilaments do not exhibit such loops.

As we have explained above, another feature which defines graphene quality is the size of the nanoplatelets obtained.

The loops formed between the free edges of the carbon nanofilaments during the heat treatment of step d), produce larger graphene oxide nanoplatelets than those obtained with other known methods in which such heat treatment do not take place, thus producing a high quality material.

On the other hand, the invention has as object a method for manufacturing graphene oxide nanoplatelets, even when they could be of the same length as some nanoribbons described in the state of the art, their processability and possible applications are very different from those of said graphene nanoribbons when both are compared.

As has been described above, the graphene oxide nanoribbons are elongated elements that could be considered to be one-dimensional and that are much longer than they are wide, that is, their aspect ratio being greater than 50.

On the other hand, the graphene oxide nanoplatelets obtained using the method of the invention have a 2-dimensional shape in which the aspect ratio is of less than 10. That is, said graphene nanoplatelets are not clearly longer than wide.

At an atomic scale, this difference in geometry implies substantial differences in the physical properties when comparing the nanoplatelets and the nanoribbons, meaning that some of their possible subsequent applications, and their manufacturing methods could also be very different.

Additionally, the first phase of the method for obtaining carbon nanofilaments as intermediate material of high quality at an industrial scale, and the second phase of subjecting said carbon nanofilaments to heat treatment, cleavage and fragmentation, also at an industrial scale, all together enable the bulk obtention of graphene oxide nanoplatelets of high quality, also at industrial scale.

Taking into account the special features of both graphene and its derivatives in any of their forms, it is reasonable to consider that bulk production at an industrial scale, corresponds to production volume higher than 1 gram a day.

Additionally, the invention relates to graphene oxide nanoplatelets obtained by the method described above and having the following characteristics:
  polygonal geometry,
  less than six stacked graphene layers, and
  a maximum length comprised within the interval ranging from 0.1 μm to 50 μm.

BRIEF DESCRIPTION OF THE DRAWINGS

This specification is supplemented with a set of drawings illustrating the preferred embodiment, which are never intended to limit the current invention.

DETAILED DESCRIPTION OF THE PREFERRED EMBODIMENT OF THE INVENTION

The method of the invention for obtaining graphene oxide nanoplatelets (5) is divided into two distinct phases, a first phase consisting in a method for obtaining an intermediate material, and a second phase consisting in the method for obtaining the graphene oxide nanoplatelets (5) from the intermediate material obtained in the first phase of the method.

Figure 1:
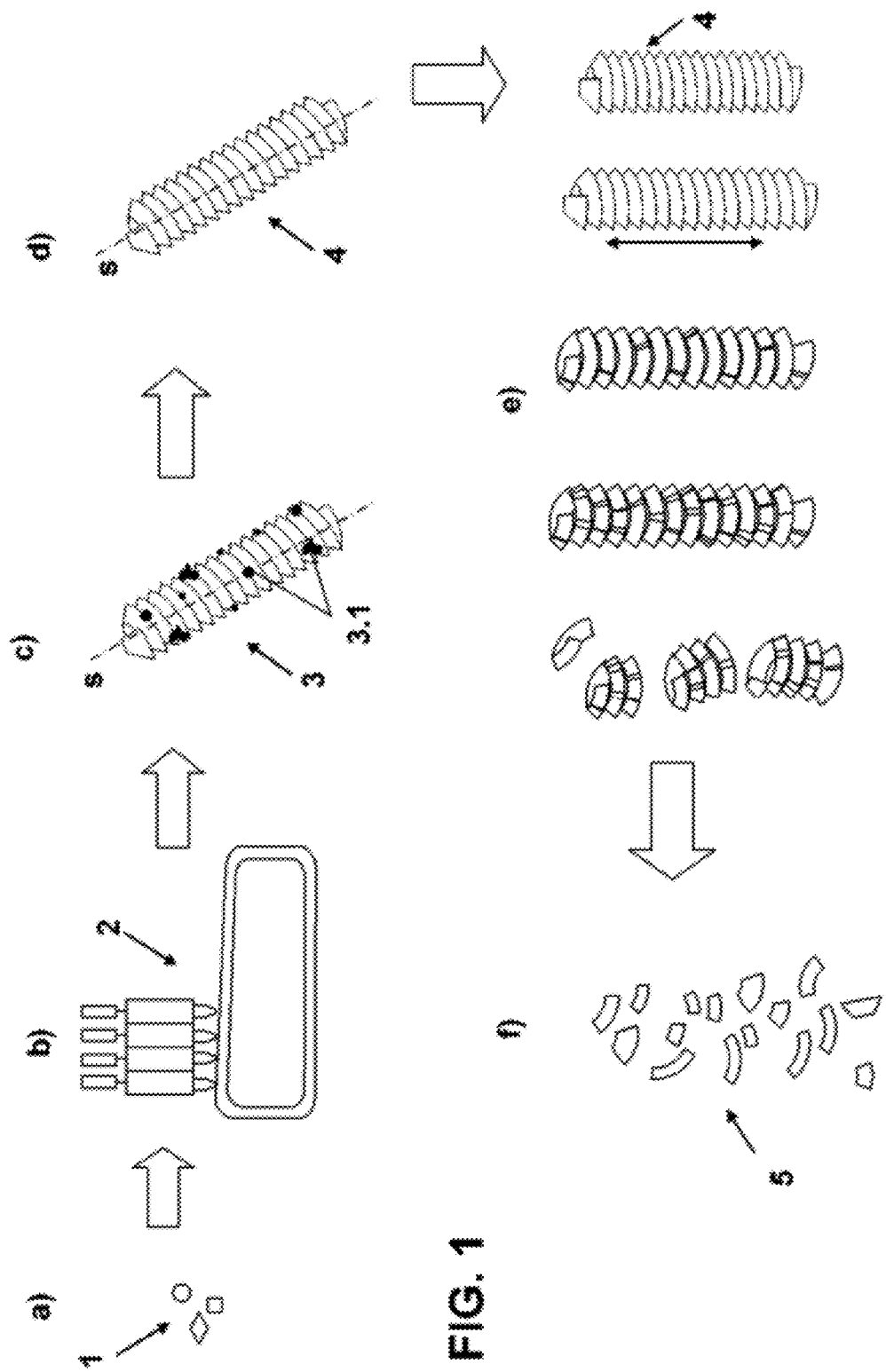
FIG. 1 shows a diagram of the method for manufacturing carbon nanofilaments, obtained as an intermediate product, and the graphene oxide nanoplatelets according to the current invention.

As can be observed in FIG. 1, which shows a diagram of the method for producing graphene oxide nanoplatelets (5) of the invention, the first phase of the method is represented by steps a), b) and c) of said method and its second phase is represented by steps d), e) and f).

The first phase of the method starts with step a) of dosing the compounds (1), required to obtain the intermediate material, and in particular at least:
  i. a hydrocarbon or mixture of hydrocarbons, such as methane or a mixture consisting mainly of methane in a percentage of more than 50%,
  ii. a nickel compound and a sulphur compound to generate catalytic particles where in a preferred case the mixture formed from the nickel compound and the sulphur compound has a molar ratio of sulphur-nickel within the interval of 1.2 to 3 once said mixture of compounds is in the furnace of step b), and
  iii. a carrier gas, such as hydrogen.

Having dosed the compounds (1) mentioned above, for example using mass dose controllers, step b) is carried out introducing said compounds into a furnace (2), which could be a vertical furnace such as that described in the applicant's patent EP1598455, such furnace (2) consisting of one or more for example vertically arranged ceramic material reaction tubes.

In particular, and due to the vertical configuration of the furnace (2), the compounds (1) are introduced through the top of the furnace (2) and the carbon nanofilaments (3) are collected via a manifold located at the bottom of the furnace (2).

The carbon nanofilaments (3) are manufactured in this furnace (2) by a chemical vapour deposition (CVD) method at a working temperature ranging between 900° C. and 1500° C. by the floating catalyst method.

Once in the furnace (2), the sulphur and nickel compounds react in order to generate the catalytic particles formed by two phases in equilibrium, a liquid NiS phase and a solid metal Ni phase.

The method conditions and starting compounds (1) described produce carbon nanofilaments (3), each one having a structure comprising a continuous ribbon of graphitic material with less than eleven graphene layers, which is spirally rolled around and along the main axis "s" of said nanofilament (3) resulting in a continuous 3-dimensional spiral structure.

During the chemical reaction that takes place inside said furnace (2), there is a catalytic decomposition on the catalytic particles of the hydrocarbon or the hydrocarbon mixture, which are in vapour phase, causing the nucleation and subsequent growth of the carbon nanofilaments (3).

The use of catalytic particles formed by nickel and sulphur compounds produces high nucleation and a faster and higher quality growth of the carbon nanofilaments (3), with respect to other known materials, as taught in the applicant's patent EP1990449.

Having obtained carbon nanofilaments (3) with the features described above, i.e. carbon nanofilaments (3) each one having a structure comprising a continuous ribbon of graphitic material with less than eleven stacked graphene layers spirally rolled around and along the main axis "s" of said nanofilament (3), step c) of the method, the intermediate material for producing the graphene oxide nanoplatelets (5) of the desired quality is obtained.

Figure 2:
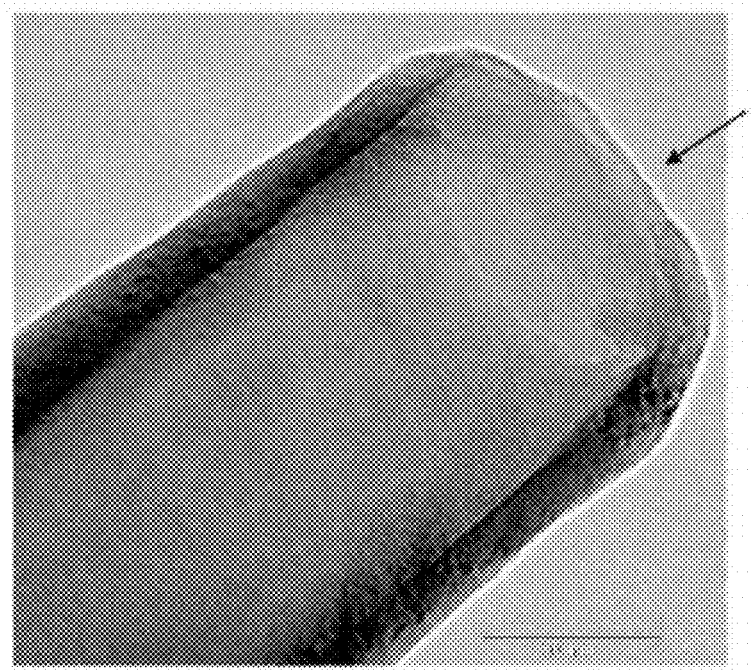
FIG. 2 shows a TEM image of the carbon nanofilaments before the heat treatment in step d).

These carbon nanofilaments (3) with the features described above are shown in the Transmission Electron Microscopy (TEM) image of FIG. 2.

As described above, the high quality of the graphene oxide nanoplatelets (5) is directly related to the number of stacked graphene layers they consist of. Therefore, the smaller the number of stacked graphene layers, the greater the quality of the product obtained, that is, the greater the quality of the graphene oxide nanoplatelets (5) obtained.

Therefore, since the carbon nanofilaments (3) obtained in step c) already have a structure formed by a small number of stacked graphene layers, the product obtained from these carbon nanofilaments also results in high-quality graphene oxide nanoplatelets (5), since the number of layers of these nanoplatelets (5) is necessarily lower than that of said nanofilaments (3) after the completion of the cleaving and fragmentation of steps e) and f) detailed below.

Once the intermediate material is obtained, step d) of the method is performed, starting the second phase of the method.

In this step d) the carbon nanofilaments (3) obtained in step c) are subjected to heat treatment by exposing them to a temperature within an interval between 1500° C. and 3000° C. in an inert atmosphere for more than 15 minutes.

An example of a treatment of this kind is disclosed in document "*The effect of temperature on the structure of helical-ribbon carbon nanofibers*" by Matthew Weisenberger et al.

One object of this heat treatment is the purification, dehydrogenation, defunctionalization and crystallisation of said nanofilaments (3), thus producing a highly crystalline modified structure with a number of carbon-carbon bonds greater than the number of said bonds present in the carbon nanofilaments (3) obtained in step c).

Thus, on the one hand we have the purification of the carbon nanofilaments, eliminating amongst other impurities (3.1) polycyclic aromatic hydrocarbons and other unwanted compounds present in the carbon nanofilaments (3) obtained in step c), and on the other hand enhancing the degree of crystallinity of its structure as a result of the defunctionalization and dehydrogenation processes. Therefore, due to the effect of these processes by exposing the nanofilaments (3) to heat treatment it is obtained a modified structure in which there is a greater number of carbon-carbon bonds.

Figure 3:
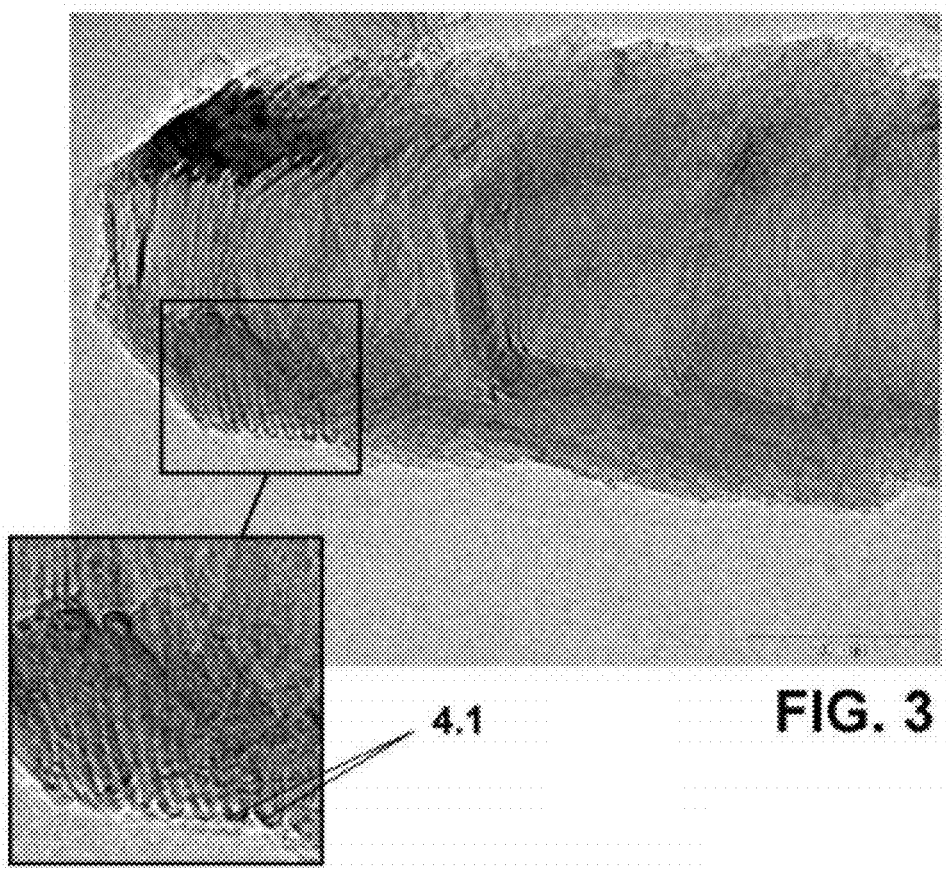
FIG. 3 shows a TEM image of the carbon nanofilaments after the heat treatment in step d), showing the polygonal geometry of the carbon nanofilaments, and on the other hand, loops bonding the free edges of neighbouring graphene layers of the carbon nanofilaments.

This produces carbon nanofilaments (4) with a clearly defined polygonal shaped structure, as can be observed in FIG. 3, which corresponds to a TEM image showing said carbon nanofilaments (4), once subjected to the heat treatment described in step d).

Figure 4:
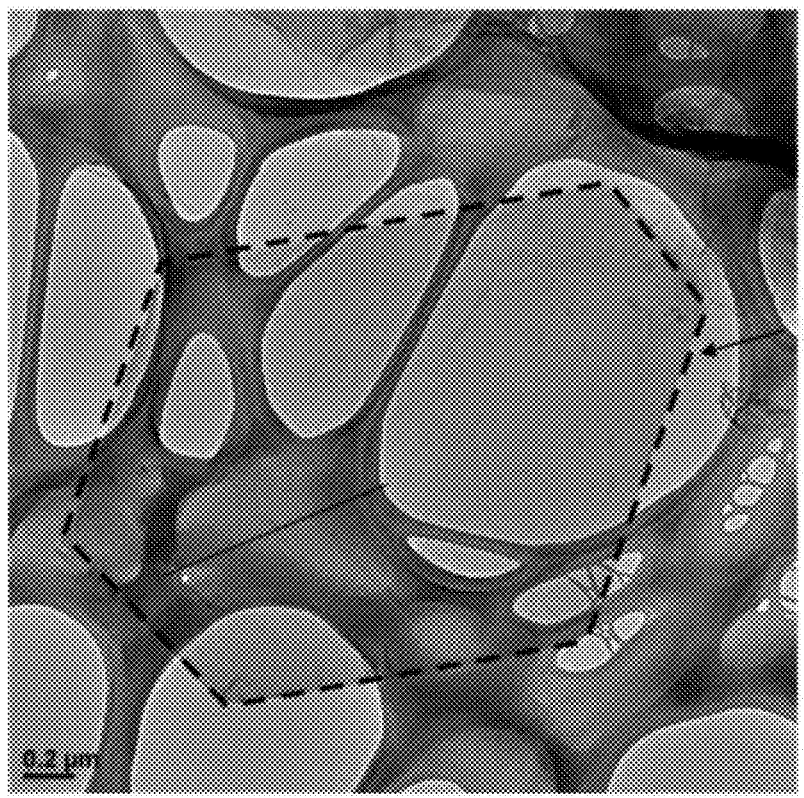
FIG. 4 shows a TEM image of the graphene oxide nanoplatelets obtained, showing their polygonal shape, where the outline of one graphene oxide nanoplatelet has been highlighted with dotted lines.
Figure 5:
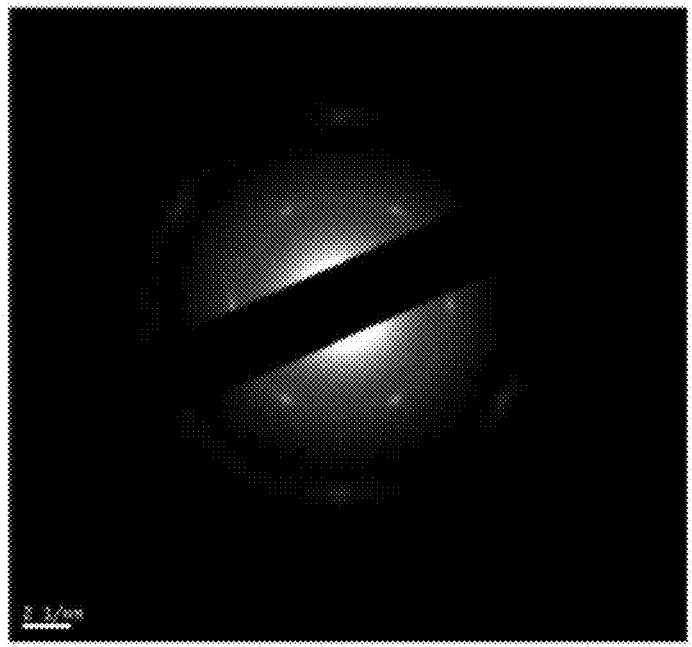
FIG. 5 shows an SAED image of graphene oxide nanoplatelets obtained according to the method of the invention, showing an electron diffraction diagram for a sample of highly crystalline graphene oxide nanoplatelets.

This highly crystalline structure increases the stability of the carbon nanofilaments (4), such that the etching performed on them in order to obtain the graphene oxide nanoplatelets (5), is performed in a more orderly and controlled way than if these carbon nanofilaments had not been subjected to the heat treatment described in step d), thus producing graphene oxide nanoplatelets (5) with a regular shaped structure and a clearly defined polygonal shape, as can be observed in FIGS. 4 and 5.

On the other hand, said heat treatment causes the formation of loops (4.1) or bonds between the free edges of neighbouring graphene layers of the carbon nanofilaments (4), which can be observed in the TEM image shown in FIG. 3.

This phenomenon occurs as a result of the dehydrogenation and defunctionalization of the free edges of the carbon nanofilaments (4), such that once the functional groups and the hydrogen atoms are removed from said free edges there is an increase in the number of carbon-carbon bonds.

Thus, the carbon atoms present in the free edges of a graphene layer tend to bond with carbon atoms located in a neighbouring graphene layer, thus achieving a more stable state.

Part of the carbon-carbon bonds in these loops (4.1) are not destroyed during the subsequent chemical etching step of the carbon nanofilaments (4) neither during the completion of the cleaving process.

Therefore, from this point onwards, part of the graphene layers remain bonded through these loops (4.1) that have not been destroyed, thus producing a greater size of the graphene oxide nanoplatelets (5) than that of nanoplatelets without said loops (4.1).

Step e) of the method is performed once this step d) has finished resulting in carbon nanofilaments (4) with a highly crystalline structure, which number of carbon-carbon bonds has been increased.

This step e) consists of a chemical etching of the carbon nanofilaments (4) obtained in step d), where such chemical etching comprises a liquid phase oxidation of said carbon nanofilaments (4) in which an oxidizing agent causes the fragmentation of said carbon nanofilaments (4) and starts the cleaving of their graphene layers.

Preferably, this oxidation stage is carried out in a dehydrated medium.

Additionally, this liquid phase oxidation could be preceded by a previous stage where the graphene layers are intercalated in an acid medium.

In this case, this intercalation consists in introducing an acid, such as $H_2SO_4$, into the interplanar interstitial sites between the stacked graphene layers that form the carbon nanofilaments (4), thus occupying the interplanar interstitial sites and increasing the thickness of the interplanar room but keeping the stacked structure of the carbon nanofilaments (4), in order to enable their further etching by means of the oxidizing agent, for example $KMnO_4$, and their subsequent breakage and cleavage.

As a result of the highly crystalline configuration of the carbon nanofilaments (4) obtained in step d), this chemical etching generates cuts in the carbon nanofilaments (4) in a controlled and orderly manner, progressing and finishing said cuts in an equally controlled and orderly manner, reducing in this way the probability of the occurrence of new etchings that would result in a greater number of cuts, and therefore smaller and lower quality fragments.

Therefore, despite the fact that the high crystallinity of the carbon nanofilaments (4) makes the start of the etching the carbon nanofilaments (4) difficult, once this fragmentation is started it tends to continue in an orderly and regular manner, passing from one atom to a contiguous atom until the cut is completed, instead of generating new etchings at other points at the same time that would cause higher fragmentation of the carbon nanofilaments (4), thus generating smaller graphene oxide nanoplatelets.

Once the chemical etching of step e) is completed, the step f) is carried out finishing the cleaving of the carbon nanofilaments (4) by physical means, such as for example by applying ultrasound, completing this way the method for obtaining graphene oxide nanoplatelets (5).

The application of ultrasound waves is carried out in a liquid medium, and has the purpose of completing the cuts started in step e) that may not have finished during said step e), in order to obtain isolated fragments from oxidized carbon nanofilaments (4) of step d), such fragments being the graphene oxide nanoplatelets (5) resulting from the method of the invention.

The graphene oxide nanoplatelets (5) obtained by this method are of high quality, according to the above explained features:
  polygonal geometry delimited by clearly defined straight edges, as shown in the TEM image of FIG. 4, where the outline of a hexagonal graphene oxide nanoplatelet (5) has been highlighted with dotted lines,
  less than six stacked graphene layers, and
  a maximum length comprised between 0.1 µm and 50 µm.

In addition, the invention relates to graphene oxide nanoplatelets (5) with the features cited above.

Once the method for obtaining graphene oxide nanoplatelets is completed other steps or post-processes could be performed as a continuation of the steps described above, which could generate derivative products from said graphene oxide nanoplatelets (5).

One example may be performing a reduction step in order to obtain graphene nanoplatelets.

This reduction step could be of two types, a chemical reduction step or a thermal reduction step.

The chemical reduction step could be performed in two different ways, in a liquid phase or in a vapour phase.

Similarly, this chemical reduction step could be performed with the addition of ammonia.

Likewise, said chemical reduction step could be carried out with the addition of a surfactant.

On the other hand, the reducing agents used in said reduction step could be chosen from amongst different families of compounds such as hydrazines, iodides, phosphines, phosphites, sulphides, sulphites, hydrosulphites, borohydrides, cyanoborohydrides, aluminium hybrids, boranes, hydroxylamines and diimines.

The thermal reduction could be carried out in two different ways, by a high-temperature thermal flash in an inert atmosphere or by progressive heating, said progressive heating could also be carried out either in an inert atmosphere or in a reducing atmosphere.

As alternative, said thermal reduction could be performed either previously placing the graphene oxide nanoplatelets (5) on a substrate or directly on graphene oxide nanoplatelets (5) without the aid of any substrate.

Having completed the reduction step in order to obtain graphene nanoplatelets, these graphene nanoplatelets could be additionally subjected to a doping step in order to obtain additional especial properties in a controlled manner, by introducing non carbon atoms within the graphene nanoplatelets (5). Another example of post-processing of graphene oxide nanoplatelets could be a functionalisation step by bonding different functional groups with the graphene oxide nanoplatelets in order to obtain functionalised graphene oxide nanoplatelets.

This functionalisation step could also be performed on reduced graphene oxide nanoplatelets (5) in order to obtain functionalisaded graphene nanoplatelets.

The functionalisation step could make use of the oxygenated groups present in the graphene oxide nanoplatelets (5), such as the carboxylic groups, which could be either anchoring sites for other compounds such as a polymer, or could also be the foundation for forming other groups, such as for example halogen groups or nitrogenous groups.

Once said nanoplatelets, either graphene oxide nanoplatelets or graphene nanoplatelets have been functionalised, they could also be intercalated into a polymer matrix in order to produce graphene nanocomposites.

A further example of a post-process is deposition of graphene oxide nanoplatelets (5) or graphene nanoplatelets on a substrate in order to obtain conductive graphene oxide sheets, for instance for those applications where conductivity is required.

Deposition on a substrate of either oxide graphene nanoplatelets (5) or graphene nanoplatelets after a reduction step could be performed in different ways.

One way of deposition could be electrophoresis, in which the deposition is carried out on an electrode by applying an electric field on graphene oxide nanoplatelets (5) or graphene nanoplatelets dispersed in a liquid. This deposition of nanoplatelets is performed by coagulation, such that by accumulating them on the electrode resulting in a rigid and homogeneous deposit on it.

Another way of deposition could be "spin coating" deposition by applying a centrifugal force. In order to perform this deposition technique, an excess of a suspension of graphene oxide nanoplatelets (5) or graphene nanoplatelets is placed on a substrate that is made to rotate at high speed such that said suspension is homogeneously spread over the substrate by the effect of the centrifugal force.

Another way of deposition could be immersing a substrate in a suspension either of graphene oxide nanoplatelets or graphene nanoplatelets in a liquid. The speed used to extract the substrate from this suspension allows controlling the thickness of the resulting coating, such thickness increasing as the extraction speed increases. Once the coating substrate has been extracted the liquid is removed, thus leaving behind a uniform deposit of graphene oxide nanoplatelets (5) or graphene nanoplatelets, as appropriate.

Another way of deposition known as doctor blading consists in the deposition on a substrate of a liquid suspension either of graphene oxide nanoplatelets or graphene nanoplatelets by making them flow as a continuous sheet aided by a doctor blade. Once the coating of the substrate has been finished the liquid is removed.

Another way of deposition is the technique known as inkjet printing. This technique is based on 2D printing techniques, by projecting small droplets of ink containing either graphene oxide nanoplatelets or graphene nanoplatelets on a substrate. Once deposited, said droplets solidify leaving a thin layer of deposit on the substrate.

The invention claimed is:

1. A method for obtaining graphene oxide nanoplatelets, said method comprising the following steps:
   a) dosing of at least the following compounds:
      i. a hydrocarbon or mixture of hydrocarbons,
      ii. a compound of nickel and a compound of sulphur to generate catalytic particles,
      iii. a carrier gas,
   b) placing the dosed compounds listed in step a) inside a furnace with a working temperature of between 900° C. and 1500° C., where a chemical vapour deposition method occurs by a floating catalyst method,
   c) obtaining an intermediate material comprising carbon nanofilaments, the structure of which comprises a continuous graphitic ribbon where said ribbon comprises a stacking of less than eleven graphene layers spirally rolled around and along a nanofilament main axis,
   d) heat treatment of the carbon nanofilaments obtained in step c) by exposing them to a temperature comprised between 1500° C. and 3000° C. in an inert atmosphere in order to purify, dehydrogenate, defunctionalise and crystallise said nanofilaments to a modified structure in which loops are formed between graphene layers by carbon-carbon bonds,
   e) chemical etching comprising a phase of liquid phase oxidation of the treated carbon nanofilaments from step d), causing their fragmentation, so that starting the cleaving of said graphene layers, wherein at least part of the carbon-carbon bonds, created in step d) in the form of loops between adjacent graphene spirally rolled layers, are maintained,
   f) completing the carbon nanofilament cleaving method by a physical method in order to obtain graphene oxide nanoplatelets with the following features:
      polygonal geometry,
      less than six stacked graphene layers,
      a maximum length comprised between 0.1 µm and 50 µm.

2. A method for obtaining graphene oxide nanoplatelets according to claim 1, characterised in that the hydrocarbon used in step a) of the method is methane or a mixture consisting mainly of methane in a percentage of more than 50%.

3. A method for obtaining graphene oxide nanoplatelets according to claim 1, characterised in that the carrier gas used in step a) of the method is hydrogen.

4. A method for obtaining graphene oxide nanoplatelets according to claim 1, characterised in that once the mixture of the nickel compound and the sulphur compound is in the furnace of step b) they form catalytic particles having a molar ratio of sulphur-nickel within the interval between 1.2 and 3.

5. A method for obtaining graphene oxide nanoplatelets according to claim 1, characterised in that the furnace used in step b) of the method is a vertical furnace.

6. A method for obtaining graphene oxide nanoplatelets according to claim 1, characterised in that the treatment carried out in step d) of the method lasts longer than 15 minutes.

7. A method for obtaining graphene oxide nanoplatelets according to claim 1, characterised in that the liquid phase oxidation carried out in step e) of the method is performed in a dehydrated medium.

8. A method for obtaining graphene oxide nanoplatelets according to claim 1, characterised in that the liquid phase oxidation of step e) is preceded by an intercalation step into the graphene layers where said intercalation is performed in an acid medium.

9. A method for obtaining graphene oxide nanoplatelets according to claim 1, characterised in that the physical method used in step f) for completing the graphene oxide cleaving consists in the application of ultrasound.

10. A method according to claim 1, further comprising performing, after step f), a reduction step of the graphene oxide nanoplatelets in order to obtain graphene nanoplatelets.

11. A method for obtaining graphene nanoplatelets according to claim 10, characterised in that the reduction step consists of a chemical reduction in either a liquid phase or in a vapour phase.

12. A method for obtaining graphene nanoplatelets according to claim 11, characterised in that the chemical reduction is performed with the addition of ammonia.

13. A method for obtaining graphene nanoplatelets according to claim 11, characterised in that the chemical reduction is performed with the addition of a surfactant.

14. A method for obtaining graphene nanoplatelets according to claim 10, characterised in that the reduction step consists of a thermal reduction by either a high-temperature thermal flash or by progressive heating.

15. A method for obtaining graphene nanoplatelets according to claim 14, characterised in that the thermal reduction is performed in either a reducing atmosphere or in an inert atmosphere.

16. A method for obtaining graphene nanoplatelets according to claim 10, characterised in that a doping step is performed on the graphene nanoplatelets.

17. A method for obtaining graphene oxide nanoplatelets according to claim 1 or graphene nanoplatelets according to claim 10, characterised in that a functionalisation step is performed by bonding a functional group to either the graphene oxide nanoplatelets or to the graphene nanoplatelets.

18. A method for obtaining graphene oxide nanoplatelets or graphene nanoplatelets according to claim 17, characterised in that the functional groups comprise a halogen group, a nitrogenous group or a polymer.

19. The method of claim 17, further comprising, following the functionalisation step, depositing the graphene nanoplatelets or the graphene nanoplatelets onto a substrate to provide a layered substrate.

20. The method of claim 19, wherein the graphene nanoplatelets are deposited by a method selected from the group consisting of electrophoresis, immersion, spin coating, doctor blading or inkjet printing.

21. A method for obtaining a layered substrate, the method comprising performing a deposition, onto the substrate, of the graphene oxide nanoplatelets of claim 1 or the graphene nanoplatelets of claim 10.

22. A method for obtaining a layered substrate according to claim 21, characterised in that the deposition is performed by the methods chosen from electrophoresis, immersion, spin coating, doctor blading or inkjet printing.

* * * * *